(12) United States Patent
Wang et al.

(10) Patent No.: US 11,378,423 B2
(45) Date of Patent: Jul. 5, 2022

(54) LONG-DISTANCE OPTICAL CABLE PHYSICAL SAFETY MONITORING SYSTEM

(71) Applicant: Guangdong Fuan Science & Technology Development Co., Ltd., Dongguan (CN)

(72) Inventors: Chao Wang, Dongguan (CN); Bo Jia, Dongguan (CN)

(73) Assignee: GUANGDONG FUAN SCIENCE & TECHNOLOGY DEVELOPMENT CO., LTD., Dongguan (CN)

( * ) Notice: Subject to any disclaimer, the term of this patent is extended or adjusted under 35 U.S.C. 154(b) by 554 days.

(21) Appl. No.: 16/467,953

(22) PCT Filed: Jul. 24, 2017

(86) PCT No.: PCT/CN2017/094130
§ 371 (c)(1),
(2) Date: Jun. 8, 2019

(87) PCT Pub. No.: WO2018/214271
PCT Pub. Date: Nov. 29, 2018

(65) Prior Publication Data
US 2020/0072645 A1     Mar. 5, 2020

(30) Foreign Application Priority Data

May 23, 2017  (CN) .......................... 201710373256.0

(51) Int. Cl.
*G01D 5/353*  (2006.01)
*G01V 8/16*   (2006.01)
(Continued)

(52) U.S. Cl.
CPC .......... *G01D 5/35306* (2013.01); *G01V 8/16* (2013.01); *H04B 10/2507* (2013.01)

(58) Field of Classification Search
CPC .. G01D 5/35306; G01D 5/35303; G01V 8/16; G01V 8/10; H04B 10/2507; G01H 9/004; G08B 13/124
See application file for complete search history.

(56) References Cited

U.S. PATENT DOCUMENTS 7,992,440 B2 *  8/2011  Kumagai ............... G01H 9/004
                                              356/465
9,417,103 B2 *  8/2016  Chen ....................... E21B 47/06

FOREIGN PATENT DOCUMENTS

CN       1612174 A     5/2005
CN       101216976 A   7/2008
(Continued)

*Primary Examiner* — Seung C Sohn
(74) *Attorney, Agent, or Firm* — Cheng-Ju Chiang

(57) ABSTRACT

A long-distance optical cable physical safety monitoring system, including a light source module, a light interference module, a sensing module, a reflection module, a photovoltaic conversion module, and a data processing module. The light interference module is use for dividing a light beam into multiple light beams; the sensing module is use for transmitting the multiple light beams; the reflection module is used for reflecting the multiple light beams to make the light interference module to output an interference signal; the photovoltaic conversion module is used for converting the interference signal to obtain a data signal; the data processing module is used for processing the data signal. The long-distance optical cable physical safety monitoring system is passive, low in energy consumption, anti-jamming, low in false positive rate, simple in construction, and convenient in maintenance.

10 Claims, 2 Drawing Sheets

(51) Int. Cl.
*H04B 10/25* (2013.01)
*H04B 10/2507* (2013.01)

(56) References Cited

FOREIGN PATENT DOCUMENTS

| | | |
|---|---|---|
| CN | 101242224 A | 8/2008 |
| CN | 101383072 A | 3/2009 |
| CN | 101937602 A | 1/2011 |
| CN | 102288208 A | 12/2011 |
| CN | 102322880 A | 1/2012 |
| CN | 102419186 A | 4/2012 |
| CN | 102506912 A | 6/2012 |
| CN | 102879081 A | 1/2013 |
| CN | 103090961 A | 5/2013 |
| CN | 104236697 A | 12/2014 |
| CN | 104913840 A | 9/2015 |
| CN | 105004487 A | 10/2015 |
| CN | 105134293 A | 12/2015 |
| CN | 205154255 U | 4/2016 |
| WO | 2010/073002 A1 | 7/2010 |

\* cited by examiner

LONG-DISTANCE OPTICAL CABLE PHYSICAL SAFETY MONITORING SYSTEM

CROSS REFERENCE TO RELATED APPLICATION

The present application is a 35 U.S.C. § 371 National Phase conversion of International (PCT) Patent Application No. PCT/CN2017/094130, filed on Jul. 24, 2017 which is based on and claims priority of Chinese patent application No. 201710373256.0, filed on May 23, 2017. The entire disclosure of the above-identified application is hereby incorporated by reference herein and made a part of this specification.

FIELD OF THE INVENTION

The present invention relates to the field of monitoring, and more particularly to a long-distance optical cable physical safety monitoring system.

BACKGROUND OF THE INVENTION

At present, the traditional long-distance optical cable physical safety monitoring system used for monitoring external disturbance mainly includes video long-distance optical cable physical safety monitoring system, leakage/vibration cable, electronic fence and so on.

However, video long-distance optical cable physical safety monitoring system is easy to be restricted by terrain conditions, not suitable for severe weather, and easy to avoid by deliberate intruders; moreover, sensing part of the leakage/vibration cable is active and the system consumes a lot of power. Therefore, the system cost is high under the condition of long-distance monitoring. In addition, the electronic fence is harmful to some extent, and the maintenance cost of long-term continuous use is high. In addition, the above traditional external disturbance monitoring technology is greatly affected by the external environment, such as electromagnetic interference, chemical corrosion, etc., and there are many limitations and functional defects in the practical application.

SUMMARY OF THE INVENTION

The purpose of the present invention is to overcome the defects existing in the existing long-distance optical cable physical safety monitoring system, and to provide a long-distance optical cable physical safety monitoring system which is passive, low energy consumption, anti-interference, low false positive rate, simple construction, convenient maintenance advantages, and can real-time monitor an external disturbance of a long distance which can over 160 km.

A long-distance optical cable physical safety monitoring system includes a light source module, a light interference module, a sensing module, a reflection module, a photoelectric conversion module, a data processing module. The light source module is configured to output a light beam; the light interference module is connected to the light source module and configured to divide the light beam into multiple light beams; the sensing module includes a sensing optical cable and is configured to transmit the multiple light beams; the reflection module is connected to the sensing module and configured to reflect the multiple light beams to make the light interference module to output an interference signal; the photoelectric conversion module is configured to convert the interference signal to obtain a data signal; the data processing module is connected to the photoelectric conversion module and configured to process the data signal to monitor a disturbance at the sensing optical cable; wherein, the optical interference module includes a first coupler, a second coupler and a delay fiber. The delay fiber is between a first end of the first coupler and a first end of the second coupler, and a second end of the first coupler is connected to a second end of the second coupler.

Further, the first coupler is a 3*3 coupler and the second coupler is a 2*2 coupler.

Further, the light source module includes a super luminescent diode, a spectral filter and an erbium doped fiber amplifier.

Further, the long-distance optical cable physical safety monitoring system further includes a light attenuation module, the light attenuation module is between the light interference module and the sensing module.

Further, the light attenuation module includes a variable optical attenuator.

Further, the reflection module includes a bidirectional erbium-doped fiber amplifier, a tail fiber, a phase-carrier modulation module and a faraday rotation mirror.

Further, the phase-carrier modulation module uses a piezoelectric ceramic to modulate an optical signal so that the long-distance optical cable physical safety monitoring system is in a large-signal carrier modulation state.

Further, the fail fiber includes a single-mode optical fiber which is in encircle axis states.

Further, the photoelectric conversion module includes a first PIN photodiode FET component, a second PIN photodiode FET component, a low-noise-broadband amplifier, an anti-aliasing filter, a dual-channel synchronous analog-to-digital converter, an industrial control board Further, the data processing module is configured to monitor and position the disturbance at the sensing optical cable through energy discrimination, dual-channel filtering and phase reduction processing.

The long-distance optical cable physical safety monitoring system is passive, low in energy consumption, anti-jamming, low in false positive rate, simple in construction, and convenient in maintenance, and can real-time monitor the external disturbance of the long distance which can over 160 Km.

DETAILED DESCRIPTION OF PREFERRED EMBODIMENTS

In order to make the purpose, technical scheme and advantages of the invention clearer, the embodiment of the invention will be further described in combination with the attached figure below.

Figure 1:
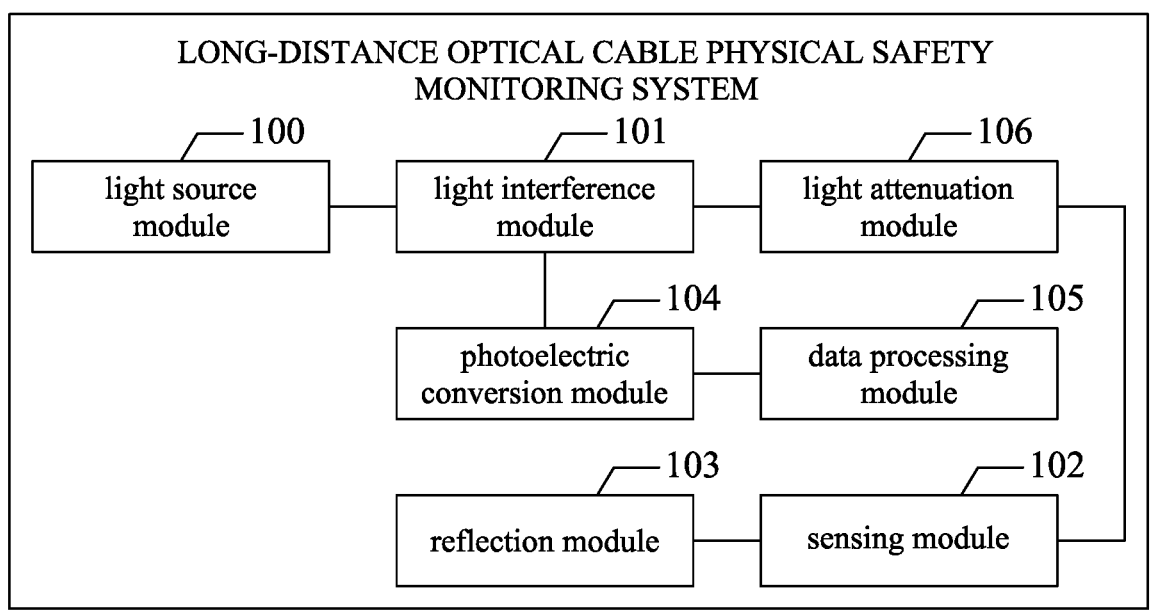
FIG. 1 is a structural diagram of a long-distance optical cable physical safety monitoring system in a first embodiment of the invention.

FIG. 1 is a structural diagram of a long-distance optical cable physical safety monitoring system in a first embodiment of the invention. As shown in FIG. 1, the long-distance optical cable physical safety monitoring system includes a light source module 100, a light interference module 101, a sensing module 102, a reflection module 103, a photoelectric conversion module 104, and a data processing module 105.

Wherein, the light source module 100 is configured to output a light beam; the light interference module 101 is connected to the light source module 100 and configured to divide the light beam into multiple light beams. The sensing module 102 is configured to transmit the multiple light beams. The reflection module 103 is connected to the sensing module 102 and configured to reflect the multiple light beams to make the light interference module 101 to output an interference signal. The photoelectric conversion module 104 is configured to convert the interference signal to obtain a data signal.

Figure 2:
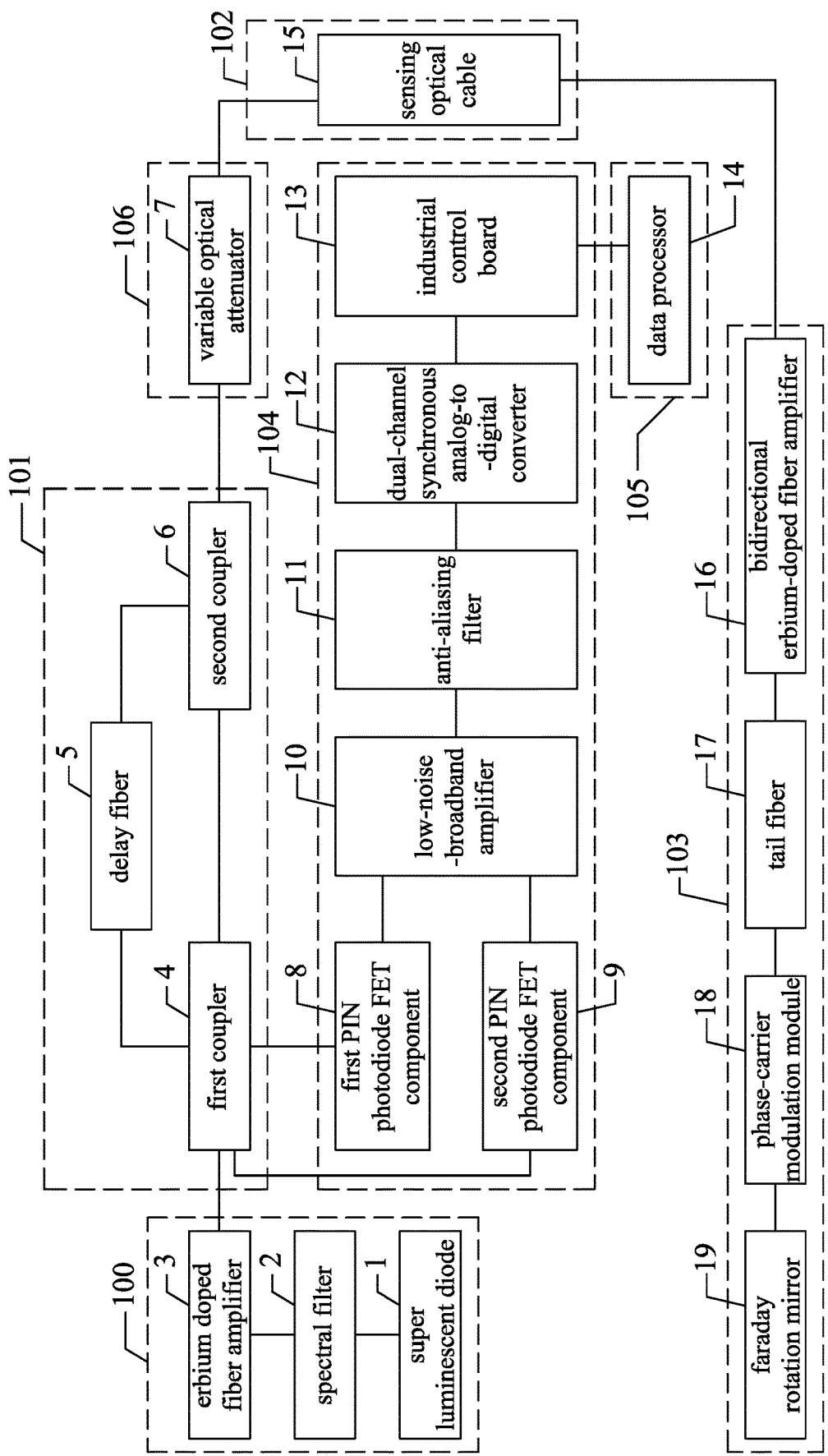
FIG. 2 is a concrete structure diagram of each module of the long-distance optical cable physical safety monitoring system in a second embodiment of the invention.

Wherein, the optical interference module 101 includes: a first coupler 4 (not shown in FIG. 1, please refer to FIG. 2), a delay fiber (not shown in FIG. 1, please refer to FIG. 2), a second coupler 6 (not shown in FIG. 1, please refer to FIG. 2). The delay fiber 5 is between a first end of the first coupler 4 and a first end of the second coupler 6, and a second end of the first coupler 4 is connected to a second end of the second coupler 6.

Wherein, the data processing module 105 is connected to the photoelectric conversion module 104 and configured to process the data signal to monitor a disturbance at the sensing optical cable 15.

In one embodiment, the long-distance optical cable physical safety monitoring system further includes a light attenuation module 106, the light attenuation module 106 is between the light interference module 101 and the sensing module 102.

FIG. 2 is a concrete structure diagram of each module of the long-distance optical cable physical safety monitoring system in a second embodiment of the invention. As shown in FIG. 2, in one embodiment, the light source module includes a super luminescent diode 1, a spectral filter 2 and an erbium doped fiber amplifier 3.

In one embodiment of the invention, the first coupler 4 is a 3*3 coupler and the second coupler 6 is a 2*2 coupler. In other embodiments, of course, the second coupler 6 May also be a 3*3 coupler, etc.

In one embodiment of the invention, the light attenuation module 106 includes a variable optical attenuator 7. The variable optical attenuator 7 is used for attenuation control of an optical signal to adapt to different lengths of monitoring lines.

In one embodiment of the invention, the photoelectric conversion module 104 includes a first PIN photodiode FET component 8, a second PIN photodiode FET component 9, a low-noise-broadband amplifier 10, an anti-aliasing filter 11, a dual-channel synchronous analog-to-digital converter 12, an industrial control board 13.

In one embodiment of the invention, the data processing module 105 includes a data processor 14.

Wherein, the sensing module includes a sensing optical cable 15.

In one embodiment of the invention, the reflection module 103 includes a bidirectional erbium-doped fiber amplifier 16, a tail fiber 17, a phase-carrier modulation module 18 and a faraday rotation mirror 19.

In one embodiment of the invention, the fail fiber 17 includes a single-mode optical fiber which is in encircle axis states.

In one embodiment of the invention, the phase-carrier modulation module 18 uses a piezoelectric ceramic to modulate the optical signal so that the long-distance optical cable physical safety monitoring system is in a large-signal carrier modulation state.

In one embodiment of the invention, the data processing module 105 is configured to monitor and position the disturbance at the sensing optical cable through energy discrimination, dual-channel filtering and phase reduction processing.

Specifically, the light source module 100, the light interference module 101, the photoelectric conversion module 104, the data processing module 105 and the light attenuation module 106 constitute a front end of the long-distance optical cable physical safety monitoring system, and the reflection module 103 is a tail end of the long-distance optical cable physical safety monitoring system. When the long-distance optical cable physical safety monitoring system monitors the external disturbance, the sensing optical cable 15 is laid along the line to be monitored, and the sensing optical cable 15 is connected to the front end of the long-distance optical cable physical safety monitoring system and the end of the long-distance optical cable physical safety monitoring system. Open the front chassis power of the long-distance optical cable physical safety monitoring system, the super luminescent diode 1, for example, output a wide spectral beam having a 1550 nanometers (nm) central wavelength, the spectral filter 2 filter the wide spectral beam to a narrow spectral beam, and the narrow spectral beam is amplified by the erbium doped fiber amplifier 3, and then inputted to the 3*3 coupler 4 and divided into two beams, and the two beams respectively through 2*2 coupler 6 into the sensing cable 15, and amplified by the bidirectional erbium-doped fiber amplifier 16 into the tail fiber 17, and then through the phase-carrier modulation module 18 for carrier modulation, and reflected by the faraday rotation mirror 19. Finally, optical signals passing through the following four paths are received at the first PIN photodiode FET component 8 and the second PIN photodiode FET component 9:

light beam A: 1→2→3→4→5→6→7→15→16→17→18→19→18→17→16→15→7→6→5→4 flight beam B: 1→2→3→4→6→7→15→16→17→18→19→18→17→16→15→7→6→4 light beam C: 1→2→3→4→5→6→7→15→16→17→18→19→18→17→16→15→7→6→4 flight beam D: 1→2→3→4→6→7→15→16→17→18→19→18→17→16→15→7→6→5→4

Since the length of delay fiber 5 is far greater than the coherent length of the light source, only the light beam C and the light beam D can produce interference, while the light beam A and the light beam B form DC signal. The light beams C and D have the same optical path and interfere at 3*3 coupler 4. If the sensing cable 15 by external disturbances, the light beam C and the light beam D carry the phase change caused by the external disturbance modulated by the phase carrier modulation module 18, which causes the change of the interference result at 3*3 coupler 1, the two interference signals is detected and photoelectric converted by the first PIN photodiode FET component 8 and the second PIN photodiode FET component 9 to electrical signals, the electrical signals amplified by the low-noise-broadband amplifier 10 and filtered by the anti-aliasing filter 11 and then converted by the dual-channel synchronous analog-to-digital converter 12 to a digital signal into industrial control board 13, for further data collection process. In the data processing module 14, the monitoring and positioning of external disturbances are finally realized through energy discrimination, double-channel filtering and phase reduction.

The foregoing is only a better embodiment of the invention and does not limit the invention. Any modification, equivalent replacement, improvement, etc. made in the spirit and principles of the invention shall be included in the protection scope of the invention.

The long-distance optical cable physical safety monitoring system of the present invention, can only use a 100 g channel of dense where division multiplexing of optical fibers, the longest cable monitoring of more than 160 kilometers, the biggest loss is acceptable for the monitor cable is not more than 34 db, single disturbance location accuracy is better than that of 50 meters, event disturbance accuracy is better than 10 meters, passive, low energy consumption, anti-jamming, low rate of false positives, simple construction, easy maintenance.

What is claimed is:

1. A long-distance optical cable physical safety monitoring system, comprising:
    a light source module, configured to output a light beam;
    a light interference module, connected to the light source module and configured to divide the light beam into multiple light beams;
    a sensing module, comprising a sensing optical cable and configured to transmit the multiple light beams;
    a reflection module, connected to the sensing module and configured to reflect the multiple light beams to make the light interference module to output an interference signal;
    a photoelectric conversion module, configured to convert the interference signal to obtain a data signal; and
    a data processing module, connected to the photoelectric conversion module and configured to process the data signal to monitor a disturbance at the sensing optical cable;
    wherein, the light interference module comprises a first coupler, a second coupler and a delay fiber, the delay fiber is between a first end of the first coupler and a first end of the second coupler, and a second end of the first coupler is connected to a second end of the second coupler.

2. The long-distance optical cable physical safety monitoring system according to claim 1, wherein the first coupler is a 3*3 coupler and the second coupler is a 2*2 coupler.

3. The long-distance optical cable physical safety monitoring system according to claim 1, wherein the light source module comprises a super luminescent diode, a spectral filter and an erbium doped fiber amplifier.

4. The long-distance optical cable physical safety monitoring system according to claim 1, wherein the long-distance optical cable physical safety monitoring system further comprises a light attenuation module, the light attenuation module is between the light interference module and the sensing module.

5. The long-distance optical cable physical safety monitoring system according to claim 4, wherein the light attenuation module comprises a variable optical attenuator.

6. The long-distance optical cable physical safety monitoring system according to claim 1, wherein the reflection module comprises a bidirectional erbium-doped fiber amplifier, a tail fiber, a phase-carrier modulation module and a faraday rotation mirror.

7. The long-distance optical cable physical safety monitoring system according to claim 6, wherein the phase-carrier modulation module uses a piezoelectric ceramic to modulate an optical signal so that the long-distance optical cable physical safety monitoring system is in a large-signal carrier modulation state.

8. The long-distance optical cable physical safety monitoring system according to claim 6, wherein the fail fiber comprises a single-mode optical fiber which is in encircle axis states.

9. The long-distance optical cable physical safety monitoring system according to claim 1, wherein the photoelectric conversion module comprises a first PIN photodiode FET component, a second PIN photodiode FET component, a low-noise-broadband amplifier, an anti-aliasing filter, a dual-channel synchronous analog-to-digital converter, an industrial control board.

10. The long-distance optical cable physical safety monitoring system according to claim 1, wherein the data processing module is configured to monitor and position the disturbance at the sensing optical cable through energy discrimination, dual-channel filtering and phase reduction processing.

* * * * *